(12) United States Patent
Bellabal et al.

(10) Patent No.: US 9,429,073 B2
(45) Date of Patent: Aug. 30, 2016

(54) HYPERSTATIC TRUSS COMPRISING CONNECTING RODS

(75) Inventors: Francois Robert Bellabal, Fontainebleau (FR); Thomas Alain Christian Vincent, Palaiseau (FR)

(73) Assignee: SNECMA, Paris (FR)

( * ) Notice: Subject to any disclaimer, the term of this patent is extended or adjusted under 35 U.S.C. 154(b) by 622 days.

(21) Appl. No.: 13/821,465

(22) PCT Filed: Sep. 8, 2011

(86) PCT No.: PCT/FR2011/052059
§ 371 (c)(1),
(2), (4) Date: Mar. 7, 2013

(87) PCT Pub. No.: WO2012/032270
PCT Pub. Date: Mar. 15, 2012

(65) Prior Publication Data
US 2013/0167553 A1    Jul. 4, 2013

(30) Foreign Application Priority Data

Sep. 8, 2010    (FR) ...................... 10 57117

(51) Int. Cl.
*F02C 1/00* (2006.01)
*F02C 7/20* (2006.01)
*F01D 25/24* (2006.01)
*B64D 27/26* (2006.01)

(52) U.S. Cl.
CPC .............. *F02C 7/20* (2013.01); *F01D 25/246* (2013.01); *B64D 2027/262* (2013.01); *B64D 2027/266* (2013.01); *Y02T 50/671* (2013.01)

(58) Field of Classification Search
CPC ............ F23R 3/60; F02C 7/20; B64D 27/26; B64D 2027/262; B64D 2027/264; B64D 2027/266
See application file for complete search history.

(56) References Cited

U.S. PATENT DOCUMENTS

| 2,744,722 | A | | 5/1956 | Orr |
| 3,826,088 | A | * | 7/1974 | Nash ................. C07D 277/587 285/123.1 |
| 5,076,049 | A | | 12/1991 | Von Benken et al. |
| 2006/0253057 | A1 | | 11/2006 | Qi et al. |
| 2009/0100963 | A1 | | 4/2009 | Audart-Noel et al. |
| 2010/0011780 | A1 | * | 1/2010 | Varney ................. F01D 25/243 60/796 |

(Continued)

FOREIGN PATENT DOCUMENTS

| EP | 1 050 693 | 11/2000 |
| FR | 1 452 811 | 4/1966 |

(Continued)

OTHER PUBLICATIONS

International Search Report Issued Jan. 19, 2012 in PCT/FR11/52059 Filed Sep. 8, 2011.

*Primary Examiner* — Gerald L Sung
(74) *Attorney, Agent, or Firm* — Oblon, McClelland, Maier & Neustadt, L.L.P

(57) ABSTRACT

A hyperstatic truss including connecting rods, used for suspension of a first ring, forming part of an engine case, inside a second ring concentric to the first ring, the connecting rods being secured at one end to the first ring and at the other end to the second ring. The tensile stiffness of the connecting rods is greater than the compressive stiffness thereof. The truss for example can be used for suspension of a ducted-fan turbine engine with an elongate bypass duct.

11 Claims, 2 Drawing Sheets

(56) References Cited

U.S. PATENT DOCUMENTS

| | | | |
|---|---|---|---|
| 2012/0018577 A1* | 1/2012 | Quiroz-Hernandez | B64D 27/26 244/54 |
| 2013/0014515 A1 | 1/2013 | Bellabal et al. | |
| 2013/0037688 A1 | 2/2013 | Bellabal et al. | |
| 2013/0052005 A1* | 2/2013 | Cloft | 415/213.1 |
| 2013/0099051 A1 | 4/2013 | Bellabal et al. | |

FOREIGN PATENT DOCUMENTS

| | | |
|---|---|---|
| GB | 2 242 711 | 10/1991 |
| WO | 2006 103372 | 10/2006 |

\* cited by examiner

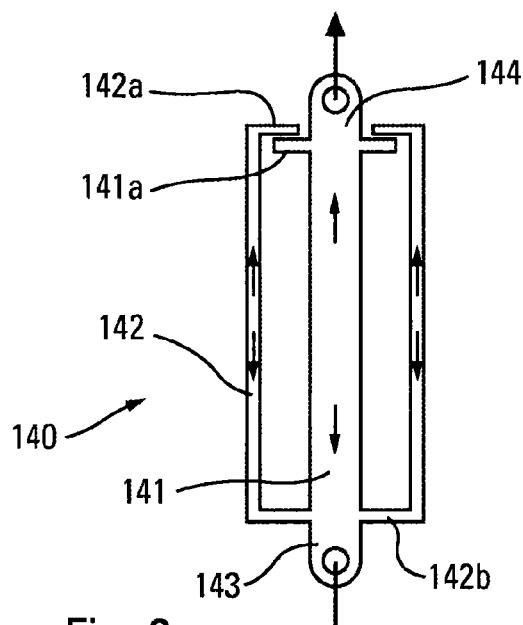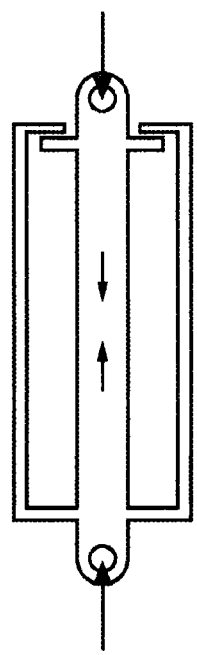
Fig. 3    Fig. 4
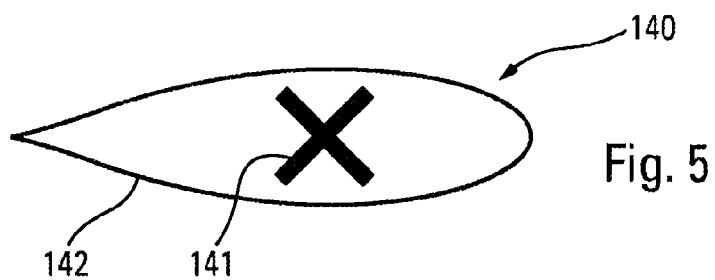
Fig. 5
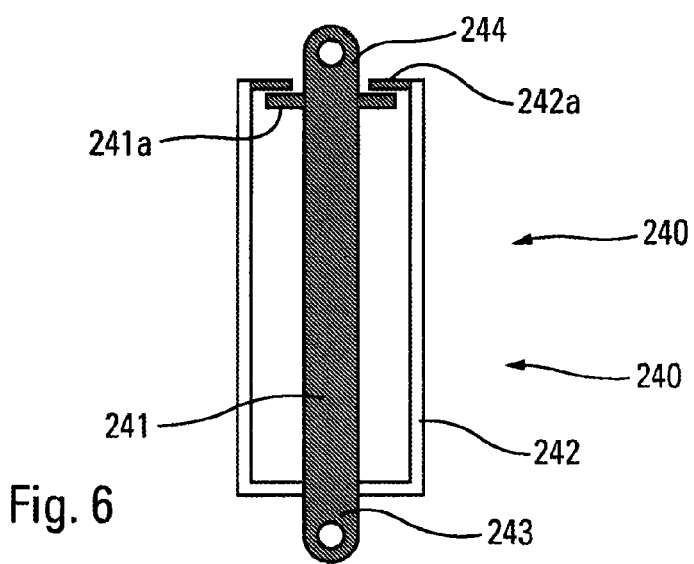
Fig. 6

HYPERSTATIC TRUSS COMPRISING CONNECTING RODS

BACKGROUND OF THE INVENTION

1. Field of the Invention

The present invention relates to the field of bypass turbojet engines notably comprising an elongate bypass flow casing. It relates to any engine of this type, fixed to the fuselage of the aircraft or military engines.

2. Description of the Related Art

A bypass turbojet engine comprises a fan which when mounted at the front of the engine delivers a flow of compressed air which is divided into two concentric annular flows: a primary flow and a secondary or bypass flow surrounding the primary flow. The latter is guided toward the part of the engine that forms the gas generator and which comprises compression stages, a combustion chamber and a section comprising turbines by which the fan is driven. The primary flow containing the combustion gases is then ejected in an exhaust nozzle. The bypass flow is straightened downstream of the fan and is likewise ejected. In engines for civilian applications, it provides most of the thrust.

In one configuration, the bypass flow is guided in a fan duct which extends around the engine between the fan and the primary flow exhaust nozzle. It comprises two substantially cylindrical coaxial walls which between them delimit an annular space. The internal wall of the fan duct forms the shroud of the gas generator. The external wall of the fan duct forms a case which extends in the plane of the straightener vanes as far as the exhaust nozzle. The outer case of the fan duct is more commonly referred to as the outer fan duct or "OFD".

The engine can be mounted under the wing of the aircraft or alternatively along the fuselage thereof, notably toward the rear. In that case, the engine comprises a fan duct as described hereinabove. The attachments of the engine to the aircraft are located in two transverse planes: one plane upstream passing through the structural front casing that is referred to as the intermediate casing and one plane downstream passing through the downstream structural casing that is referred to as the exhaust casing.

For securing the downstream end, in the case of an engine mounted on the fuselage, a structural ring is provided on the outer fan duct, OFD, this ring being connected by arms or connecting rods to the outer ring or shell ring of the exhaust casing. Patent application EP 2 022 973 in the name of the applicant company describes an example of an outer fan duct structure.

The connection between the two rings mentioned hereinabove may take the form of radial arms distributed all around the axis of the engine and secured rigidly to the two rings. The connection may also take the form of connecting rods which are inclined with respect to the axis of the engine. The connecting rods are secured to the two rings by attachments of the yoke and pin type. Such an attachment is formed of two single or double yokes, one of them secured to the end of the connecting rod and the other to the wall of the ring and through which a common pin passes. More particularly, the connecting rods are arranged in pairs, the connecting rods of each pair being tangential to the ring of the exhaust casing while at the same time converging onto an attachment of the ring of the outer fan duct.

Regardless as to whether the connection is formed of radial arms or of connecting rods, it is hyperstatic (statically redundant); loads thus pass through all the arms or connecting rods in a way that is determined by the relative strengths thereof. To simplify the description, both connecting rods and arms will be referred to hereinafter as connecting rods.

Because the path followed by tensile loads is the same as that followed by compressive loads, the connecting rods according to the prior art need to be sized to withstand both tensile loads and compressive loads.

In the solutions of the prior art, all the connecting elements: pins, yokes, connecting rods or arms, are sized to be able mechanically to withstand the loads resulting from the imbalance generated by the loss of a fan blade. This is in order to obviate the risk of the engine becoming detached in the event of such a critical situation arising. The mass of all the components that make up the connection is therefore high.

It is an object of the present invention to create a hyperstatic truss of connecting rods applied to the suspending of an engine casing ring inside another ring which, while reacting loads that might be generated by the breakage of a fan blade, makes it possible to reduce the overall mass in comparison with the solutions of the prior art.

BRIEF SUMMARY OF THE INVENTION

Another object of the invention is to create an engine suspension which does not carry a penalty from the aerodynamic standpoint.

In order to be able to achieve these objectives, the applicant company has taken account of the following:

The loss of a fan blade is likely to generate high both compressive and tensile loads. The magnitude of the maximum compressive load and that of the maximum tensile load are substantially the same because the out-of-balance force rotates about the axis over time and all the connecting rods would be subjected in turn to tensile and compressive loads.

When it comes to sizing the connecting rods, because their tensile strength is better than their compressive strength, the target is generally to ensure resistance to buckling under compression. There is therefore a required minimal second moment of area for the cross section of the connecting rod. In order to meet this requirement, the main cross section of the connecting rod may be increased, which carries an aerodynamic penalty, or alternatively, the cross-sectional area of the connecting rod may be increased, but this carries a mass penalty.

Moreover, insofar as the connecting rod is positioned across the airflow path and creates significant drag, its profile has also to be aerodynamically optimized. This then is another constraint that is added to the requirement of mechanical integrity.

Connecting rods that meet all these requirements are therefore oversized as far as tensile strength is concerned. The margin on breakage under tension is in excess of 200%.

Thus, with the invention relating to a hyperstatic truss of connecting rods applied to the suspending of a first ring, that forms part of an engine casing, inside a second ring concentric with the first ring, the connecting rods being secured by one end to the first ring and by the other end to the second ring, the hyperstatic truss of connecting rods is characterized in that the connecting rods have a tensile strength that is higher than their compressive strengths.

Because the truss is hyperstatic, the loads passing through the connecting rods are determined by the relative strengths of the various connecting rods. The invention has therefore consisted in using connecting rods the compressive strength of which is lower than the tensile strength so that the maximum compressive loads are reduced whereas the maximum tensile loads are increased. The margins with respect to breakage under tension, on the one hand, and with respect to buckling under compression on the other hand, can thus be set independently of one another, allowing for optimal sizing.

The connecting rods according to the invention comprise one or more parts designed to be able to work in compression and in tension, and one or more other parts that work only in tension.

The invention is preferably implemented using connecting rods comprising an internal rod and a shroud surrounding the internal rod, the internal rod being designed to be able to work in compression and in tension, the shroud working only in tension.

This arrangement makes it possible to choose the best cross section for the internal rod, optimizing the mass of the components, independently of any aerodynamic consideration, and to choose the best profile for the shroud to minimize its drag, independently of any other constraint regarding shape.

According to one embodiment, the internal rod and the shroud of the connecting rods have a pair of surfaces bearing against one another only when tension is applied to the internal rod, the tensile loads being transmitted between the two ends both by the internal rod and by the shroud. The path followed by the compressive loads passes only through the internal rod.

According to one embodiment, the rod and the shroud are secured to one another by one end, the other end having said pair of surfaces. According to another embodiment, the rod and the shroud are independent of one another between the same securing points, for example the rod and the shroud being holed for the passage of the connecting rod securing pins, the shroud not working in compression because of a clearance between it and one of the two pins.

According to an alternative form, the connecting rods comprise at least two pairs of bearing surfaces distributed along the axis of the rod.

The resistance of the internal rod to buckling is further improved with connecting rods having means of bearing radially against the internal surface of the shroud, so as to prevent the internal rod from buckling when subjected to compressive stress.

For preference, the internal rod is of cruciform cross section.

According to another alternative form, the internal rod is threaded, with a plate that is axially movable and forms the bearing surfaces; the connecting rod is thus easier to adjust because the clearance between the bearing surfaces is adjusted by turning the rod. Further, a preload can be applied, so as to have play-free bearing surfaces.

The solution of the invention has the notable benefit of making it easier to produce a connecting rods shroud that has an aerodynamic profile, because this shroud works only in tension, which means that the shape of the profile need not be taken into consideration for sizing purposes.

According to one particular application, the truss has six connecting rods arranged in a triangle tangentially to the internal ring.

Finally, the invention also relates to a front fan engine comprising an annular duct forming the bypass duct and an exhaust casing with a casing ring and a concentric ring in the shroud of the bypass duct, the truss as claimed in one of the preceding claims providing the connection between the two rings.

BRIEF DESCRIPTION OF THE SEVERAL VIEWS OF THE DRAWINGS

The invention will be better understood, and other objects, details, features and advantages thereof will become more clearly apparent from reading the detailed explanatory description that follows of some embodiments of the invention which are given by way of purely nonlimiting illustrative examples, with reference to the attached schematic drawings.

FIG. 3 depicts, in longitudinal section, one first embodiment of a connecting rod of the truss, according to the invention, the arrows indicating the path followed by the load when the connecting rod is working in tension;

FIG. 4 depicts the connecting rod of FIG. 3, the arrows indicating the path followed by the loads when the connecting rod is working in compression;

FIG. 5 is a view in cross section of a connecting rod according to the invention;

FIG. 6 is a view in longitudinal section of a first alternative form of embodiment;

DETAILED DESCRIPTION OF THE INVENTION

Figure 1:
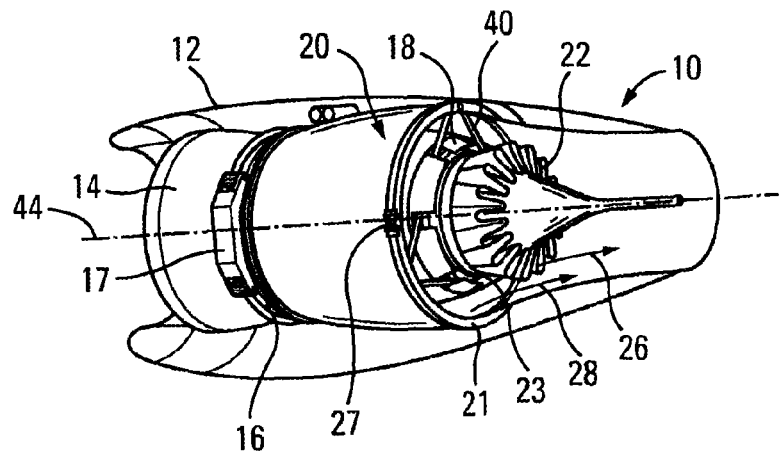
FIG. 1 is a schematic perspective view of a bypass turbojet engine with an elongate bypass flow duct.

The turbojet engine 10 of FIG. 1 is a front fan bypass turbojet engine inside a nacelle 12 and comprising, from upstream to downstream, a fan casing 14, an intermediate casing 16 and an annular fan duct formed between two substantially cylindrical cases: an internal case 18 forming the shroud of the part of the engine through which the primary flow passes and forming the gas generator, and an outer case 20. The outer fan duct 20 here extends as far as downstream of the region of confluence between the primary flow 26 and the secondary or bypass flow 28 where the two flows are mixed by the mixer 22. The outer fan duct 20 has a structural function by reacting load between the engine and the aircraft on which it is mounted. It thus comprises a structural ring 21 here connected by connecting rods 40 to the outer ring 23 of the exhaust casing of the gas generator. The engine is secured to the aircraft at the upstream end by an attachment 17 secured to the intermediate casing and at the downstream end by an attachment 27 secured to the structural ring 21 of the outer fan duct 20.

Figure 2:
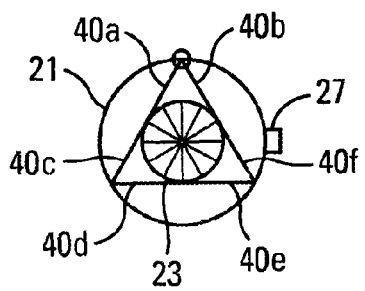
FIG. 2 is a schematic cross section through the engine of FIG. 1, showing the two structural rings, one of them the exhaust casing ring and the other the outer fan duct ring, which are connected by a hyperstatic truss comprising six connecting rods.

In the example depicted, the connection between the structural ring 21 of the outer fan duct and the ring 23 of the exhaust casing is formed of connecting rods 40 attached by their ends to the two rings. Each attachment comprises, in a way that is known and has not been depicted, a yoke secured to the ring and a yoke secured to the end of the connecting rod, the two yokes having a common pin passing through them. As may be seen in FIG. 2, the connection is more precisely formed of three pairs of connecting rods 40, tangential to the exhaust casing ring 23 and converging in pairs on the outer structural ring 21.

According to the prior art, and notably on account of the fact that the loads induced by the imbalance revolve about the axis, the elements that make up the connection between the rings have been dimensioned in such a way that each is capable of transmitting both compressive and tensile loads in the event of a fan blade breakage. In particular, the connecting rods are sized for compressive buckling because they are not as strong in compression as they are in tension. An imbalance in one direction is reacted in tension by some of the connecting rods and in compression by the others. Because the connecting rods all have the same strength, the load is distributed equally between them. For example, a load of 10 T in one direction has to be transmitted both in compression and in tension. This situation is not ideal because a connecting rod has a margin to breakage under tension of well over 10 T if it has been dimensioned to absorb a maximum compressive load of 10 T. This margin to breakage is not utilized in the structures of the prior art.

Given that the truss is hyperstatic (it is statically redundant in the plane from three connecting rods), the loads passing through the connecting rods are determined by the ratio of strengths among the various connecting rods, the connecting rods of which the truss according to the invention is made have less strength when working in compression than they do when working in tension. It therefore follows that the maximum compressive loads that a connecting rod has to be able to withstand may be lower and the maximum tensile loads may be higher. The latter condition imposes no penalty because the margin to breakage under tension is high. In other words, it is possible to set the margin to breakage under tension and the margin to breakage under compression independently of one another. This then is an additional path to optimization.

Nonlimiting embodiments of connecting rods having a tensile strength that differs from the tensile strength are described hereinafter.

The connecting rod 140 of FIG. 3 is viewed in longitudinal section. It has an internal rod 141 and a shroud 142. The internal rod is provided with a yoke at each of its ends 143, 144, respectively. These yokes allow the connecting rod to be secured to the two rings of the engine. The rod is surrounded along its axis from one end to the other by a shroud 142 of which the profile perpendicular to the axis of the connecting rod is aerodynamic as can be seen in FIG. 5, which is a view in cross section. This shroud is secured to the rod at one end 143. At its other end, the end 144 end, the shroud comprises a bearing surface 142a perpendicular to the axis for a plate 141a secured to the rod 141. At rest, the two bearing surfaces are not in contact; according to another embodiment, the two bearing surfaces are in contact as the result of preload between the rod and the shroud. When a tensile load is applied between the two ends 143 and 144. The surface 141a bears against the surface 142a in such a way that the tensile loads between the two ends pass both through the rod 141 and the shroud 142. The section of connecting rod which is working comprises the section of the internal rod Si and the section of the external shroud Se.

When the connecting rod is working in compression as indicated by the load arrows of FIG. 4, the forces pass from one end to the other via the rod 141 only because the two surfaces 141a and 142a are no longer bearing against one another. The section of the connecting rod which is working is Si. Thus, in a simple way, a connecting rod has been created the tensile strength of which differs from the compressive strength. The ratio of strengths is a function of the ratio (Se+Si)/Si.

In the hyperstatic truss formed of connecting rods of this type the load is transmitted firstly by the strongest connecting rods, which are those which work in tension and which have the highest margin to breakage.

The advantage of the solution is that by making the shroud work the overall mass of the connecting rod is optimized because the rod can be made lighter. Further, the maximum compressive load that the internal rod has to withstand can be set at a lower level because the compressive loads are always lower.

The shape of the internal rod can be optimized by taking account only of the mechanical stress because it does not come into contact with the air of the bypass flow. FIG. 5 shows one example of the geometry of the cross section of the rod to optimize its resistance to buckling; the shape is that of a cross.

Figure 7:
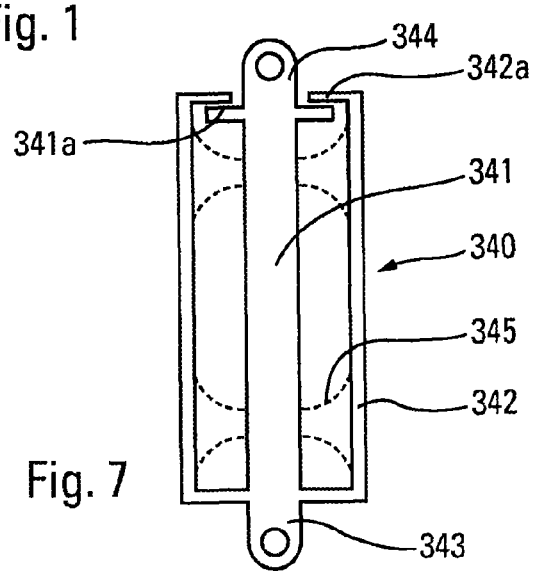
FIG. 7 is a view in longitudinal section of another alternative form of embodiment.

In order further to improve the resistance to buckling, there is another planned embodiment depicted in FIG. 7. The connecting rod 340 comprises an internal rod 341 and a shroud 342 which, like the connecting rod 140, are connected by one end 343 and come into contact under tension, at the other end 344, via respective bearing surfaces 341a and 342a. This connecting rod further comprises webs 345 for radial contact between the internal rod and the shroud. These webs modify the buckling mode of the internal rod 341 through boundary conditions.

Figure 8:
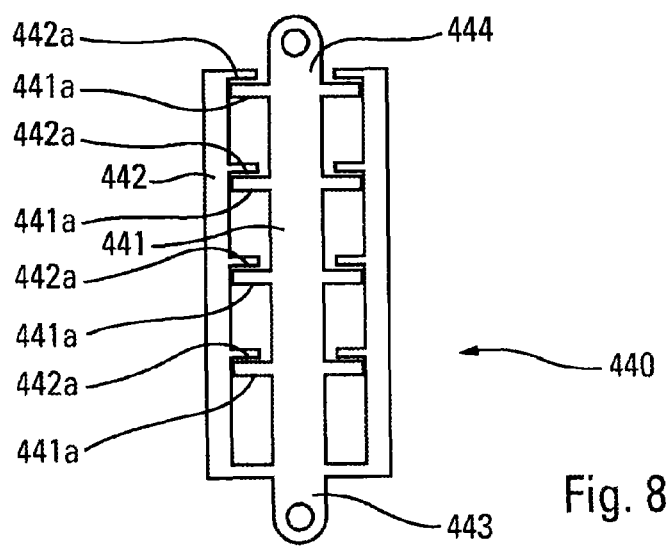
FIG. 8 is a view in longitudinal section of another alternative form of embodiment.

Other alternative forms of embodiment are illustrated in FIGS. 6 and 8.

In FIG. 6, the internal rod 241 of the connecting rod 240 is threaded and is screwed into the shroud 242. The bearing surface 241a via which the rod 241 bears against the bearing surface 242a of the shroud at the end 244 is adjustable heightwise by screwing the rod into the shroud. This measure allows full adjustment of the connecting rods in the truss at the time of assembly.

In FIG. 8, another alternative is to form several pairs of bearing surfaces 441a, 442a, respectively, along the internal rod 441 inside the shroud 442 between the two ends 443 and 444.

The invention is not restricted to the embodiments illustrated in the present patent application; it encompasses alternative forms that are within the competence of the person skilled in the art. That includes instances in which, for example, the shroud and the rod are arranged not one inside the other but side by side, for example with an aerodynamic protection upstream and another downstream, these two together constituting the part that works only in tension.

The invention claimed is:

1. A hyperstatic truss comprising:
    connecting rods applied to suspending a first ring, that forms part of an engine casing, inside a second ring concentric with the first ring, the connecting rods being secured by a first end to the first ring and by a second end to the second ring,
    wherein a tensile strength of the connecting rods is higher than a compressive strength of the connecting rods, said connecting rods comprising a set of one or more parts configured to transmit compressive and tensile loads between the ends of said connecting rods, and one or more other parts configured to cooperate with at least one part of said set of parts to transmit only tensile loads between the first a second ends of said connecting rods.

2. The truss as claimed in claim 1, wherein the connecting rods comprise an internal rod and a shroud surrounding the internal rod, the internal rod configured to work in compression and in tension, the shroud working only in tension.

3. The truss as claimed in claim 2, wherein the internal rod and the shroud of the connecting rods include a pair of mutually facing surfaces bearing against one another when tension is applied to the internal rod, the tensile loads then being transmitted between the two ends of the connecting rods by the internal rod and the shroud.

4. The truss as claimed in claim 3, wherein the connecting rods comprise at least two pairs of bearing surfaces distributed at different axial locations along an axis of the internal rod.

5. The truss as claimed in claim 2, wherein the connecting rods include a web which bears radially against an internal surface of the shroud, to prevent the internal rod from buckling when subjected to compressive stress.

6. The truss as claimed in claim 2, wherein the internal rod is of cruciform cross section.

7. The truss as claimed in claim 2, wherein the internal rod is threaded, with a plate that is axially movable and forms the bearing surface of the internal rod.

8. The truss as claimed in claim 2, wherein the shroud of the connecting rods has an aerodynamic profile perpendicular to an axis of the connecting rods.

9. The truss as claimed in claim 1, comprising six connecting rods arranged in a triangle tangentially to the first ring.

10. A front fan engine comprising:
an annular duct forming a bypass duct and an exhaust casing with a casing ring and a concentric ring in the shroud of the bypass duct,
the truss as claimed in claim 1 providing connection between the casing ring and concentric ring.

11. A hyperstatic truss comprising:
connecting rods applied to suspending a first ring, that forms part of an engine casing, inside a second ring concentric with the first ring, the connecting rods being secured by a first end to the first ring and by a second end to the second ring,
wherein a tensile strength of the connecting rods is higher than a compressive strength of the connecting rods, wherein the connecting rods include an internal rod and a shroud surrounding the internal rod, the internal rod working in compression and in tension, and the shroud working only in tension, and
wherein a first end of the shroud is secured to the internal rod, and a second end of the shroud includes a bearing surface which abuts a bearing surface provided on the internal rod when tension is applied to the internal rod such that tensile forces are transmitted between the first and second ends of the connecting rods by the internal rod and the shroud.

* * * * *